April 25, 1961 J. A. ROBERTS 2,981,091
LEAK STANDARD
Filed July 11, 1957 2 Sheets-Sheet 1

Inventor:
John A. Roberts
by Leslie C. Byer
His Attorney

April 25, 1961  J. A. ROBERTS  2,981,091
LEAK STANDARD
Filed July 11, 1957  2 Sheets-Sheet 2
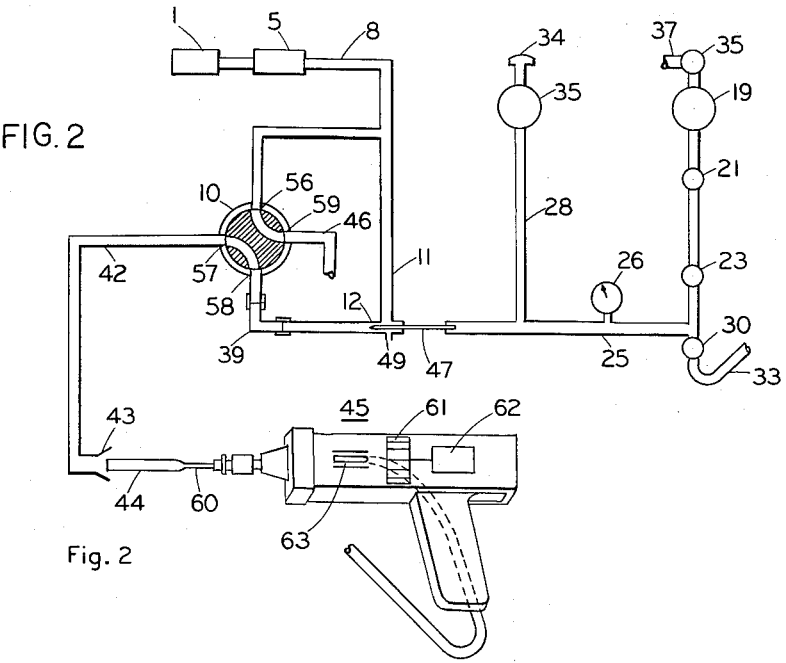
FIG. 2
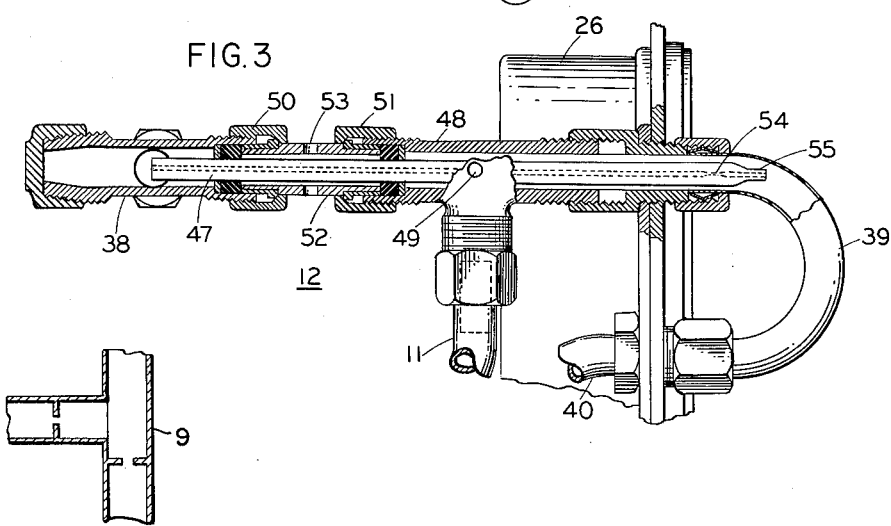
FIG. 3
FIG. 4.
Inventor:
John A. Roberts
by Leslie C. Byer
His Attorney

United States Patent Office 2,981,091
Patented Apr. 25, 1961

2,981,091

LEAK STANDARD

John A. Roberts, Lynnfield, Mass., assignor to General Electric Company, a corporation of New York Filed July 11, 1957, Ser. No. 671,265

10 Claims. (Cl. 73—1)

My invention relates to a leak standard for calibrating a detector in which air is supplied through a probe or search tube at a predetermined rate to an element which is sensitive to a tracer gas and provides a comparative indication of the amount of the gas normally present in the air to that which is present at a leak through which the tracer gas is supplied into the air. In order to obtain a quantitative evaluation of the magnitude of a new leak, the response of such a detector to this leak must be calibrated against a standard adjustable leak which can be set to provide controlled rates of leakage which are adjusted to give the same indication on the detector as was obtained at the new leak.

My leak standard is particularly suited for calibrating a detector such as described and claimed in United States Letters Patent 2,550,498, Chester W. Rice, granted April 24, 1951. This Rice apparatus may be used for detecting substances such as certain gases, vapors, smokes, and similar matter in an atmosphere by noting the increase in current flow between the electrodes of a diode due to positive ion formation at its heated anode in the presence of said substances. The sensitive diode element of the apparatus responds to certain types of substances such as the alkaline metals or other substances having ionizing potentials less than the electron work function of the electrodes, the halogens, or compounds of either. For certain substances, such as the alkaline metals and their compounds, the ion formation apparently occurs by ionization of the substance when it comes into contact with the more positively charged and heated electrode of the diode. For others, such as the halogens and their compounds, the substances appear to cause ion formation only in the presence of what might be called sensitizing materials, such as the alkaline metals and their compounds; and it further appears in this case that the sensitizing materials themselves are actually ionized to afford the desired positive ion current.

The apparatus of the Rice patent has been used for detecting leaks in pressure systems as well as leaks in vacuum systems. In either case, a tracer gas or substance to which the diode of the apparatus is sensitive is used for locating the leak. When used in detecting leaks in pressure systems, the tracer gas is supplied under pressure to the systems and the suspected areas of the system are examined by a search tube or probe through which the gas being tested is sucked in and supplied between the electrodes of the diode. When the suction end of the search tube passes over a leak, the presence of the leak is indicated by the increased conductivity of the diode due to the presence of the tracer gas which is usually a halogen-containing gas such as dichlorodifluoromethane vapor. Since the tracer gas most commonly employed for detecting leaks is a halogen compound, the apparatus has been commonly referred to as a halogen leak detector.

Commercial forms of halogen leak detectors are very sensitive instruments and will provide an indication for leak rates as small as 1/100 of an ounce per year. A typical leak detector comprises a detector unit and a control unit. The detector unit, sometimes in the form of a hand gun, contains the sensitive diode element and an impeller unit which is used to draw air through a probe or search tube by which it is supplied to the interelectrode space of the diode. The response of the diode to the presence of halogen vapors is made evident on the control unit which is electrically connected to the detector unit and provides means for adjusting the sensitivity of the diode and for giving a meter indication of the change in diode conductivity when exposed to halogen vapors of different concentrations. The control unit also embodies a balance control whereby the detector may be "zeroed" in accordance with the amount of halogen vapor normally present in the air. After the detector has been zeroed, the gas from a leak supplied to its sensitive element through its probe will provide a meter indication on the control unit which is its comparative response to the amount of gas normally present in the air and that present at a leak through which the halogen gas is being discharged. One form of such a device is illustrated and described in the Proceedings of the I.R.E. for August 1950, beginning on page 852 in an article entitled "Positive-Ion Emission, a Neglected Phenomenon," by W. C. White.

A calibrator for such a halogen leak detector must consequently provide means for supplying in succession through the detector probe and to its sensitive element purified air and purified air containing an adjustable and metered amount of halogen vapor. Since the sensitive diode element of the detector has substantially a linear response under its conditions of use, the difference in conduction of the sensitive element between zero setting and a leak detection response can be duplicated in the calibrating apparatus by obtaining a like change in conduction of the sensitive element and then determining from the calibration apparatus the weight flow of halogen gas or vapor which is productive of this change.

It is an object of my invention to provide a standard leak assembly for supplying metered minute quantities of gas or vapor to a purified air stream which acts as a carrier for the gas.

It is also an object of my invention to provide a standard leak assembly in which the weight flow of gas therethrough is controlled by varying the static pressure on the inlet end of a capillary tube having a bore of fixed and predetermined dimensions.

It is a further object of my invention to provide apparatus in which purified air and purified air containing a metered quantity of a gas or vapor are alternately supplied to a receptacle for the nozzle of a test instrument whose comparative response to such a gas or vapor is to be determined quantitatively.

It is another object of my invention to provide a precision device which may be used to calibrate and zero a halogen leak detector.

My invention, together with further objects and advantages thereof, will best be understood by reference to the following specification taken in connection with the accompanying drawings in which a preferred embodiment thereof has been illustrated.

In the drawings,

Fig. 2 is a diagrammatic representation of the apparatus shown in Fig. 1 and of the relationship of such apparatus to the detector unit of a halogen leak detector which is to be calibrated and zeroed thereby;

Fig. 3 is a detail, partly in section, showing the standard leak assembly forming part of the calibrating apparatus of Fig. 1; and Fig. 4 is an enlarged showing of the divider assembly of Fig. 2.

Figure 1:
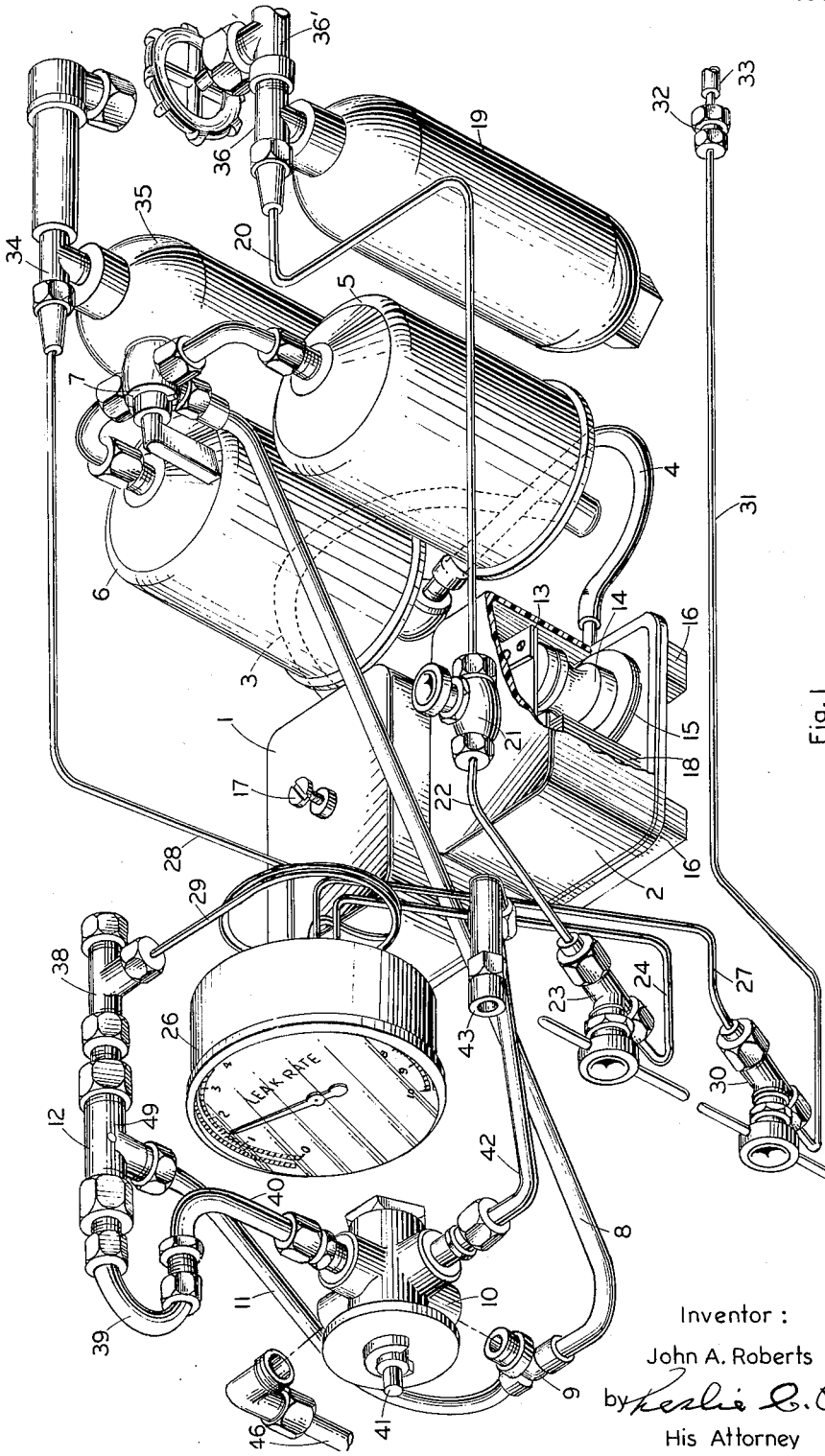
Fig. 1 is a perspective view illustrating, in their physical relationship, the several elements of a halogen leak standard embodying my invention.

The leak standard shown in Figs. 1 and 2 is made up of a halogen vapor system and a purified air system. These two systems combine to provide an adjustable halogen leak. The magnitude of the leak is indicated on a gauge which is provided with a leak rate scale.

The purified air system consists of two vibrator type air pumps 1 and 2 which supply air through pipes 3 and 4 to filters 5 and 6. The discharge openings in these filters are connected in parallel to a shut-off valve 7 which controls the flow of filtered air through a pipe 8 connected to a divider assembly 9 by means of which filtered air is supplied to selector valve 10 and, through a pipe 11, to a standard leak assembly 12. As indicated in Fig. 4, restrictions are provided in the discharge branches of the divider assembly to secure the desired division of air flow to valve 10 and to leak assembly 12.

The vibrator pumps are of a type used for supplying air to household aquariums and comprise a mechanism having a vibrating armature 13 which operates a flexible bellows 14 into which air is drawn and from which air is expelled through a flap valve mechanism 15. They are mounted on sponge rubber pads 16 so that their vibration will not be transmitted to the other parts of the apparatus. They are also provided with an adjusting screw 17 for controlling the action of the vibrator mechanism. This mechanism is of the usual electric type and is provided with a coil mounted in a magnetic structure 18 of which armature 13 forms a part. This coil is connected to a source of electric supply by a circuit and switch not shown in the drawings. These air pumps are commercially available under the trade name "Bel-Bul" and are sold in this country by Aqua Air Products of Miami, Florida. They are capable of supplying about two cubic feet of air per hour at about one pound per square inch pressure. Obviously, pumps of different construction may be substituted for those illustrated. The filters 5 and 6 are replaceable cans containing activated carbon which will purify the air supplied therethrough by removing from it halogen vapors and other vapors or gases to which the leak detector is sensitive.

The halogen vapor system comprises a halogen vapor supply tank 19 which is connected through a pipe 20, a shut-off valve 21, a pipe 22, and increase valve 23 and a pipe 24 to a pressure chamber 25 not shown in Fig. 1 but indicated in Fig. 2. This pressure chamber is a manifold, providing a common connection for pipe 24, the pressure pipe of the pressure gauge 26, and pipes 27, 28, and 29. Pipe 27 is connected through decrease valve 30 and a pipe 31 to a support fitting 32 provided with a discharge nipple on which one end of a long flexible tube 33 is connected. Pipe 28 is connected through a fitting 34 to a ballast tank 35 whose function is to maintain substantially static the pressure in the pressure chamber. This fitting 34 includes, as part thereof, a frangible metal diaphragm fuse which when ruptured permits a discharge of vapor from the vapor system to the surrounding air. This fuse provides protection for the pressure gauge 26 which is constructed to indicate a maximum pressure of ten pounds per square inch, whereas the pressure of the vapor in the supply tank 19 may be as high as eighty pounds or more. This supply tank is provided with a fitting 36 and valve 36' which is connected to a pipe 37 (Fig. 2) by means of which the supply tank 19 may be recharged with a gas or a liquid vaporizable at room temperatures, such as dichlorodifluoromethane, commonly known under the trade name of Freon 12. Pipe 29 is connected through a T-fitting 38 to the standard leak assembly 12.

The standard leak assembly discharges through a detachable test connection by-pass 39 and a pipe 40 into selector valve 10. The selector valve may be positioned in a "zero" or "leak" position by means of a knob, not shown, mounted on its spindle 41. In the zero position, this selector valve supplies purified air through a pipe 42 to a receptacle or gun fitting 43 in which the nozzle 44 (Fig. 2) of a detector unit 45 of a halogen leak detector is positioned during a calibrating operation. In this same zero position, the mixture of halogen vapor and its carrier of purified air, which is supplied through pipe 40 to selector valve 10, is discharged to the surrounding air through the valve and a pipe 46. In Fig. 1, this discharge pipe, as well as one of the branches of the divider assembly 9, have been displaced from the body portion of valve 10 in order to provide a better illustration of the structural arrangement but it is to be understood, as indicated by the dot-dash lines, that these parts are assembled and provide continuous passageways as indicated in Fig. 2. In the leak position of the selector valve 10, the halogen vapor and its carrier of purified air is supplied to gun fitting 43 through the valve and pipe 42 and the purified air from one branch of the divider assembly 9 is supplied through the valve to exhaust pipe 46.

The increase and decrease valves 23 and 30, receptacle 43, gauge 26, detachable test connection by-pass 39, the operating knob 34 for selector valve 10, and an electric switch for controlling the energization of pumps 1 and 2 are mounted on or extend through the front panel of an enclosure in which the other parts are located. The support fitting 32, recharge pipe 37 connected through valve 36' to fitting 36 of supply tank 19, and the discharge portion of diaphragm fuse fitting 34 are mounted on or extend through the back of this enclosure which is provided with a lid or cover that can be opened to provide accessibility to the various parts enclosed therein.

The standard leak assembly is shown in detail in Fig. 3. It comprises a mounting for a capillary tube 47 which extends lengthwise of a casing 48 into which the purified air is discharged through pipe 11. The conduit through this casing 48 and the bypass 39 constitute a mixing chamber into which gas is discharged from the capillary tube and mixed with the purified air supplied through pipe 11. When the nozzle 44 of a detector 45 is inserted into receptacle 43, it acts as a stopper and any surplus air supplied to casing 48 is discharged through a vent 49 in its side wall. The capillary is supported in position by couplings 50 and 51 and a pipe 52 which connect one branch of T-fitting 38 to one end of casing 48. The fittings 50 and 51 engage the outside of the capillary tube 47 and form a substantially gas-tight fit therewith. Any leakage of halogen past the seal of fitting 50 will be discharged through openings 53 in this connecting pipe 52 and consequently cannot enter casing 48.

Capillary tube 47 may be formed of glass and I prefer to use a borosilicate glass which is less liable to fracture due to temperature changes because of its small linear coefficient of expansion. It is provided with a bore of about 0.003 inch in diameter which is reduced at 54 near its discharge end 55 to a size which is normally invisible to the naked eye. This reduction in size may be accomplished by heating the tube at 54 while holding the parts thereof in alignment and allowing surface tension effects to neck in or decrease the bore size of the capillary while passing air therethrough. Capillaries of various sizes may be provided and I have used capillary tubes which will provide mass flow rates of 0 to 0.1, 0 to 1.0, and 0 to 10 ounces per year leakage of Freon 12 therethrough in the pressure range of 0–10 pounds per square inch of gauge 26. In view of the arrangement provided whereby the pressure of halogen gas at the input end of the capillary tube 47 may be varied, it is quite obvious that the leak standard is adjustable by adjusting this pressure to provide various rates of discharge of halogen at the output end or tip 55 of the capillary tube. By having the restrictions at 54 near the discharge end of the capillary tube 47, its change in flow rate responds more rapidly to changes of pressure at its input end which is connected to pressure chamber 25. The tip end 55 of the capillary tube is exposed when by-pass fitting 39 is removed, and its reduced size provides a convenient connection for a flexible tube by means of which a calibrator is attached thereto in order in turn to calibrate the leak rate of the capillary forming part of the leak standard.

The calibrator for the standard leak assembly may be of the type shown in my application Serial No. 671,342, filed July 10, 1957, and assigned to the same assignee as the present application, in which the displacement rate of a short liquid column in a capillary tube of calibrated volume is determined. The weight flow of gas thereby determined for different pressures on gauge 26 of the leak standard may be applied as indications on the inner scale of this pressure gauge which is also provided with an outer scale calibrated in pounds pressure per square inch. This outer scale is employed when making use of the calibrator to determine the weight flow of gas through capillary tube 47 at various pressures. The inner scale of the leak rate gauge 26 is conveniently calibrated to indicate weight flow in ounces per year at standard atmospheric pressure (29.921 in. of mercury at 0° C.) and at a room temperature of 25° C. If the ambient conditions differ from standard, a difference of up to several percent may exist between the indicated and actual leak rate. If maximum accuracy is desired, it will be necessary to make a correction which can be provided for by a formula and reference charts so that the indicated leak rate shown by the pressure gauge can be converted into the actual leak rate.

The viscous laminar flow of gas through a cylindrical capillary is governed by the Poiseuille law:

$$N_m = \frac{\pi}{16\eta T} \cdot \frac{a^4}{l} \cdot \frac{P_2^2 - P_1^2}{R_0 T_m}$$

wherein $N_m$ is in moles per second, $\eta T$ is the coefficient of viscosity at temperature $T$ of the capillary, $a$ and $l$ are, respectively, the radius and length of the cylindrical capillary in centimeters, $P_2$ and $P_1$ are, respectively, the upstream and downstream pressures in microbars at the ends of the capillary, $R_0$ is the gas constant, and $T_m$ is the temperature at which the moles per second is measured. With the aid of this formula, a pressure correction factor for different gauge pressures at different barometric pressures may be determined and a temperature correction factor may be determined for the ambient temperature at time of measurement. With these correction factors, the corrected gauge indication $W_{c1}$ for ambient conditions of temperature and pressure will be the leak rate gauge reading $W$ divided by the pressure correction factor $C_p$ and the temperature correction factor $K_t$, namely $$W_{c1} = \frac{W}{C_p K_t}$$

The use of my halogen leak standard will be described in connection with the diagrammatic representation thereof shown in Fig. 2, which also diagrammatically indicates the detector unit 45 of a halogen leak detector.

It is assumed that the vapor supply tank 19 is suitably charged with tracer gas or halogen vapor, that shut-off valve 21 and increase and decrease valves 23 and 30 are closed, that pressure chamber 25 and ballast tank 35 are charged with vapor under pressure, and that the motors and pumps are supplying filtered air through the two branches of the divider assembly 9 to one input port 56 of selector valve 10 and to the leak assembly 12 through pipe 11. It is also to be assumed that input port 56 of valve 10 is connected by the relative position of the parts of valve 10 to its output port 57 and that its input port 58 is connected to its output port 59, so that filtered air is supplied to receptacle 43 and the discharge from leak assembly 12 is connected to pipe 46 for discharge to the surrounding atmosphere. It will also be assumed that the nozzle 44 of the probe 60 of the gun-type detector unit 45 shown in Fig. 2 is located within receptacle 43 and that the impeller 61 driven by motor 62 is sucking air through nozzle 44, probe 60, and the electrodes of the sensitive element 63 of the detector unit. With the parts so positioned, the control unit of the leak detector is zeroed while it is being supplied with filtered air from the halogen leak standard. Thereafter, the selector valve 10 is operated to the position shown in Fig. 2 so that a measured quantity of tracer gas or vapor in a filtered air carrier is supplied to receptacle 43 and the indication of the instrument of the control unit of the leak detector is then observed to determine its indication and response to this measured quantity of halogen vapor. The rate of supplying halogen vapor through the halogen leak standard is then adjusted by either increasing or decreasing the rate of supply until its rate of supply causes the instrument of the halogen leak detector control unit to give the same indication as was observed when detecting a leak, the quantitative magnitude of which is to be determined. The mass rate of flow of gas through the leak assembly 12 is controlled by varying the pressure of the vapor in pressure chamber 25 thereof. This is accomplished by cracking the shut-off valve 21 and cautiously operating the increase valve 23 with decrease valve 30 closed until the desired pressure is obtained. If the pressure in chamber 25 is too great, it may be reduced by opening decrease valve 30 and venting the vapor through tube 33 to a remote location so that the exhaust of this vapor will not interfere with the calibrating operation by any effect it might have on the detector unit of the halogen leak detector. During a leak calibration, the valves 21, 23, and 30 are closed and the pressure in the halogen vapor system is maintained static by the ballast tank 35.

If, during adjustments, the pressure limitations of the gauge 26 are exceeded, the frangible diaphragm fuse 34 will be ruptured. If, due to this rupture, or for any reason, air is admitted to the halogen vapor system, this must be removed by clearing the system of vapor through a vacuum pump connected through tube 33 followed by the admission of vapor into the system from supply tank 19 which operation is repeated several times until all air has been removed from the halogen vapor system. In order to prevent any ingress of air into the halogen system, it is desirable to leave a desired pressure of vapor within the system when it is not in use. If the apparatus is left with the leak rate set at or near zero, a decrease in temperature can cause a partial vacuum in the system and it will be possible for air to enter through the leak capillary or the decrease valve, if open.

The filters 5 and 6 will need to be replaced from time to time and standards may be established for requiring such change when a desired ratio of the indication on zero to the difference in indication from zero to leak test is obtained. The usefulness of the filters will be extended if the air supply valve 7 is turned to the off position whenever the air pumps are not operating since this will prevent halogen vapors from diffusing back into these filters from the halogen vapor system.

In order to protect the halogen vapor system against damage from excess pressure being built up in the system due to increases in ambient temperature, the ballast tank and the vapor supply tank may be provided with fusible plugs which will melt at a certain temperature at which this dangerous condition might exist.

It is quite obvious that various modifications may be made in the particular halogen leak standard above described without departing from the spirit and scope of my invention and I consequently contemplate, in the appended claims, to cover all such modifications as come within the true spirit and scope of my invention. These modifications may involve changes in the piping arrangement, the arrangement of parts, or the substitution of equivalents for parts shown in the drawings and described above.

What I claim as new and desire to secure by Letters Patent of the United States is:

1. A standard leak assembly comprising a conduit, a capillary tube having its discharge end located in said conduit, means for supplying gas at an adjustable and substantially constant pressure to the other end of said capillary tube, means for filtering air to remove said gas therefrom and for supplying said filtered air at a desired rate through said conduit past the discharge end of said capillary tube such that the air acts as a carrier for said gas to the exit end of said conduit, the internal dimensions of said capillary and said pressure being related such that the mass rate of flow of said gas may be accurately varied by adjusting the magnitude of said pressure, and means responsive to said pressure, said responsive means being calibrated to provide an indication related to the mass rate of flow of said gas.

2. A standard leak assembly comprising a conduit, a capillary tube having its discharge end located in said conduit and having a restriction in its bore near its discharge end, means for supplying gas at an adjustable and substantially constant pressure to the other end of said capillary tube, means for supplying filtered air at a controlled rate through said conduit past the discharge end of said capillary tube to an exit end of said conduit remote from said gas supply means, and a receptacle at said exit end adapted to receive the nozzle of a test instrument.

3. Calibrating apparatus comprising a pressure chamber, means for supplying a tracer gas to said pressure chamber and for adjusting the pressure of said gas in said pressure chamber, a mixing chamber, a capillary tube connecting said pressure chamber with said mixing chamber, a filter for removing said tracer gas from the surrounding air, means for supplying the surrounding air at a desired rate through said filter and said mixing chamber to a discharge opening, the internal dimensions of said capillary and said pressure being related such that the mass rate of flow of said gas may be accurately varied by adjusting the magnitude of said pressure, and means responsive to said pressure, said responsive means being calibrated to provide an indication related to the rate of flow of said gas.

4. Calibrating apparatus comprising a pressure chamber, means for supplying a tracer gas to said pressure chamber and for adjusting the pressure of said gas in said pressure chamber, means for holding the pressure of said gas in said pressure chamber at a substantially constant value, a mixing chamber, a capillary tube connecting said pressure chamber with said mixing chamber, a filter for removing said tracer gas from the surrounding air, means for supplying the surrounding air at a desired rate through said filter and said mixing chamber to a discharge opening, the internal dimensions of said capillary and said pressure being related such that the mass rate of flow of said gas may be accurately varied by adjusting the magnitude of said pressure, and means related to said pressure to indicate the rate of flow of said gas.

5. Calibrating apparatus comprising a container for holding a tracer gas under pressure, a pressure chamber, a gauge for measuring the gas in said pressure chamber, means for supplying gas from said container to said pressure chamber and for adjusting the gas pressure in said pressure chamber, a mixing chamber, a capillary tube connecting said pressure chamber with said mixing chamber, a filter for removing said tracer gas from the surrounding air, and means for supplying the surrounding air at a desired rate through said filter and said mixing chamber to a receptacle for the suction nozzle of a test instrument, said gauge indicating the rate of flow of said gas through said capillary.

6. Calibrating apparatus comprising a container for holding a tracer gas under pressure, a pressure chamber, a ballast tank connected with said pressure chamber, a gauge for measuring the gas pressure in said pressure chamber, means for supplying gas from said container to said pressure chamber and for adjusting the gas pressure in said pressure chamber, a mixing chamber, a capillary tube connecting said pressure chamber with said mixing chamber, a filter for removing said tracer gas from the surrounding air, and means for supplying the surrounding air at a desired rate through said filter and said mixing chamber to a receptacle for the suction nozzle of a test instrument, said mixing chamber having a vent for exhausting filtered air in excess of that drawn from said receptacle by the nozzle of said test instrument.

7. Calibrating apparatus comprising a container for holding a tracer gas under pressure, a pressure chamber, a ballast tank connected with said pressure chamber, a gauge for measuring the gas pressure in said pressure chamber, means for supplying gas from said container to said pressure chamber and for adjusting the gas pressure in said pressure chamber, a mixing chamber, a capillary tube connecting said pressure chamber with said mixing chamber, a filter for removing said tracer gas from the surrounding air, means for supplying the surrounding air at a desired rate through said filter to its discharge opening, a selector valve having two input ports each of which is alternately and selectively connected to one of two output ports depending on the relative positions of the valve parts, means for connecting one output port of said valve to exhaust and the other output port thereof to a receptacle for the suction nozzle of a test instrument, and a divider assembly for connecting the discharge opening of said filter directly to one of said input ports of said valve and through said mixing chamber to the other input port thereof.

8. Calibrating apparatus comprising a container for holding a tracer gas under pressure, a pressure chamber, a ballast tank connected with said pressure chamber, a gauge for measuring the gas presure in said pressure chamber, means for supplying gas from said container to said pressure chamber and for adjusting the gas pressure in said pressure chamber, a mixing chamber, a capillary tube connecting said pressure chamber with said mixing chamber, a filter for removing said tracer gas from the surrounding air, means for supplying the surrounding air at a desired rate through said filter to its discharge opening, a selector valve having two input ports each of which is alternately and selectively connected to one of two output ports depending on the relative positions of the valve parts, means for connecting one output port of said valve to exhaust and the other output port thereof to a receptacle for the suction nozzle of a test instrument, and a divider assembly for connecting the discharge opening of said filter directly to one of said input ports of said valve and through said mixing chamber to the other input port thereof, said mixing chamber having a vent for exhausting filtered air in excess of that drawn from said receptacle by the nozzle of said test instrument.

9. A leak standard for providing an adjustable mass rate of flow of gas through a capillary tube to calibrate a leak detector comprising: means to supply under pressure a tracer gas to which the leak detector is responsive, means to selectively adjust said pressure, means to maintain the selected pressure substantially constant including a ballast tank, a capillary tube of small internal dimensions to connect said ballast tank to the leak detector being calibrated, and a gauge responsive to the said constant pressure and calibrated to indicate the mass rate of flow delivered to said tube, said capillary tube being dimensioned and said pressure being such that said flow is substantially according to Poiseuille's law, whereby the desired mass rate of flow of tracer gas may be accurately varied by adjusting the magnitude of said pressure.

10. A leak standard for providing an adjustable mass rate of flow of gas through a capillary tube to calibrate a leak detector comprising: means to supply under pressure a tracer gas to which the leak detector is responsive, means to selectively adjust said pressure, means to maintain the selected pressure substantially constant including a ballast tank, a capillary tube of fixed small internal dimensions to connect said ballast tank to the leak detector being calibrated, and a gauge responsive to the said constant pressure and calibrated to indicate the mass rate of flow delivered to said tube, said means to selectively adjust said pressure including a controlled vent from said ballast tank to bypass the gas from said tube and means to selectively control the flow of gas from said supply to said ballast tank, said capillary tube being dimensioned and said pressure being such that said flow is substantially according to Poiseuille's law, whereby the desired mass rate of flow of tracer gas may be accurately varied by adjusting the magnitude of said pressure.

References Cited in the file of this patent

UNITED STATES PATENTS

| | | |
|---|---|---|
| 1,490,510 | Gooley | Apr. 15, 1924 |
| 2,755,663 | Smith et al. | July 24, 1956 |
| 2,808,294 | Tamminga | Oct. 1, 1957 |

OTHER REFERENCES

Article: I. New Developments in Vacuum Engineering by Jacobs et al. in Journal of Applied Physics, vol. 18, January 1947, pp. 40, 41. II. Analyzing Hydrocarbon Mixtures by Podbielniak et al. in Oil and Gas Journal, April 16, 1956, pp. 216, 217.

Publication: Bulletin of Vacuum Electronic Engineering Co., New Hyde Park, L.I., New York, on Veeco Mass Spectro-meter Leak Detector Model MS–5A, July 1953.